UNITED STATES PATENT OFFICE.

CYRUS F. AXTELL, OF NEW YORK, N. Y., ASSIGNOR OF ONE-HALF TO OTTO P. AMEND, OF NEW YORK, N. Y.

LUBRICANT.

1,226,165.　　　　Specification of Letters Patent.　　Patented May 15, 1917.

No Drawing.　　Application filed July 19, 1916.　Serial No. 110,064.

*To all whom it may concern:*

Be it known that I, CYRUS F. AXTELL, a citizen of the United States, and resident of New York city, borough of Manhattan, in the county of New York and State of New York, have invented certain new and useful Improvements in Lubricants, of which the following is a specification.

The object of my invention is to provide a lubricant particularly adapted for use in machines in which low temperatures arise, which lubricant also will serve as a heat-absorbing or cooling agent in such machines and remain in a fluid condition.

When gases which contain liquid hydrocarbons are compressed and cooled or refrigerated, the liquid hydrocarbons are condensed or precipitated, such operation of compression being usually carried out in two stages, that is to say, the gas is first compressed and cooled either by the external or internal method, such as by cooling the walls and cylinder heads of the compressing machine by means of water circulating through water jackets, or else by the injection or spraying of a liquid into the cylinder, as during the compressing stroke, the gas thus compressed and cooled being then expanded into a second cylinder where the operation is repeated. In such second cylinder, however, the expansion of the highly compressed gas gives rise to a great reduction in temperature, such temperatures frequently reaching many degrees below zero, Fahrenheit. By reason of such low temperatures great difficulties have been experienced in providing a lubricating and cooling agent for gas compressing machines which would remain in a fluid condition, and my invention is particularly adapted for use as a lubricant in the cylinders of machines adapted for compressing gases containing liquid hydrocarbons.

In carrying out my invention I mix a solution of a suitable deliquescent salt with a solid lubricant, such as graphite, in suitable proportions, either with or without the admixture of alcohol. Instead of graphite, soaps of the higher fatty acids may be used. I have found that a solution of calcium chlorid ($CaCl_2$) and water, to which is added a suitable percentage of graphite, preferably the finely ground natural graphite, or the so-called deflocculated graphite produced in the electric furnace, or the soaps above referred to, provides a lubricating and cooling-agent adapted for lubricating the cylinders, pistons and piston rings of gas compressing machines in which low temperatures arise. Such composition is suitable as a lubricant for all temperatures down to approximately fifty degrees below zero, Fahrenheit, but in case it should be necessary to operate the compressing machines at lower temperatures, I add alcohol to the aforesaid composition or mixture, which alcohol will mix with the calcium chlorid without affecting the lubricating action of the graphite. Any of the primary monohydric alcohols may be used, such as methyl, ethyl, propyl, butyl, amyl, etc.

My improved lubricant may be prepared as follows: To any given quantity of a solution comprising thirty per cent. of calcium chlorid ($CaCl_2$) and seventy per cent. of water, I add say, 0.5 per cent. of solid lubricant, such as the graphite above described, stirring the mixture to a suitable extent. Where the alcohol is utilized in the composition, any suitable proportion may be used. The proportions of alcohol may be according to the following formulæ:

1 part calcium chlorid solution and solid lubricant mixture
1 part amyl alcohol
2 parts ethyl alcohol 1 part calcium chlorid solution and solid lubricant mixture
1 part ethyl alcohol
1 part propyl alcohol 1 part calcium chlorid solution and solid lubricant mixture
1 part ethyl alcohol
1 part butyl alcohol 1 part calcium chlorid solution and solid lubricant mixture
1 part methyl alcohol In either of the examples given the quantity of solid lubricant or graphite utilized may be varied from the percentage above given as may be found desirable.

Since commercial calcium chlorid has at times a slightly acid reaction, which would, of course, have a deleterious effect upon metal parts with which it might come in contact, I prefer that the solution should have a slightly alkaline reaction, for which purpose I add to the solution of calcium chlorid and water a sufficient quantity of "lime water" (viz: water containing calcium hydrate in solution) to render the solution alkaline. This not only obviates the deleterious action which may be caused by the presence of acid in the lubricant, but it also increases the lubricating properties thereof.

While I have referred to calcium chlorid solution with which the graphite is mixed, or with which graphite and alcohol are mixed, my invention is not limited to the use of a calcium chlorid solution, since solutions of any deliquescent salt or salts possessing the necessary properties may be used, where solutions of such salt or salts have the requisite property of low freezing point.

My improvement is particularly adapted for use as a lubricant in machines for compressing either air or other gases containing liquid hydrocarbons—such as natural gas or casing-head gas—and is especially adapted to such last named uses because, where the solution of a deliquescent salt, such as calcium chlorid, containing graphite (with or without alcohol in the mixture according to temperature) is used for the internal cooling of the cylinders of the compressors, (as by injecting or spraying the lubricant into the compressing cylinders), the lubricant being an aqueous mixture, is immiscible with the hydrocarbon liquid resulting from the compression of the gases and is easily separated therefrom. Such separation may be accomplished by allowing the resulting mixture containing my improved lubricant and the hydrocarbon to stand in a suitable separator, such as a tank or other vessel, whereupon the lubricant may be drawn off and separated from the hydrocarbon, and may be re-used.

Having now described my invention what I claim is:—

1. A new composition of matter comprising a solution of calcium chlorid and a solid lubricant.

2. A new composition of matter comprising a solution of calcium chlorid, a solid lubricant and alcohol.

3. A new composition of matter comprising a solution of calcium chlorid and graphite.

4. A new composition of matter comprising a solution of calcium chlorid, graphite, and alcohol.

5. A lubricant capable of use in low temperature comprising about a thirty per cent. solution of calcium chlorid, and a solid lubricant in about the proportion specified.

6. A lubricant capable of use in low temperature comprising about a thirty per cent. solution of calcium chlorid, and a solid lubricant and alcohol in about the proportions specified.

7. A lubricant capable of use in low temperature comprising about a thirty per cent. solution of calcium chlorid, and graphite and alcohol in about the proportions specified.

Signed at New York city, in the county of New York and State of New York this 18th day of July, A. D. 1916.

CYRUS F. AXTELL.

Witnesses:
T. F. BOURNE,
MARIE F. WAINRIGHT.